(12) United States Patent
Gillett et al.

(10) Patent No.: US 9,137,746 B2
(45) Date of Patent: Sep. 15, 2015

(54) DETERMINING AVAILABILITY OF AN ACCESS NETWORK

(71) Applicant: Microsoft Corporation, Redmond, WA (US)

(72) Inventors: Mark Alastair Gillett, London (GB); Soren Vang Andersen, Esch-sur-Alzette (LU); Christoffer Asgaard Rodbro, Stockholm (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 86 days.

(21) Appl. No.: 13/671,387

(22) Filed: Nov. 7, 2012

(65) Prior Publication Data

US 2014/0003405 A1 Jan. 2, 2014

(30) Foreign Application Priority Data

Jun. 29, 2012 (GB) .................................. 1211565.5

(51) Int. Cl.
*G01S 19/06* (2010.01)
*G01S 19/25* (2010.01)
(Continued)

(52) U.S. Cl.
CPC ............... *H04W 48/20* (2013.01); *G01S 19/06* (2013.01); *G01S 19/25* (2013.01); *G01S 19/256* (2013.01);
(Continued)

(58) Field of Classification Search
CPC . H04L 1/0003; H04L 1/0009; H04L 27/2602; H04L 1/0025; H04L 1/0026; H04L 1/0079; H04L 1/04; H04L 25/0226; H04L 25/0228; H04L 5/0007; H04L 5/0037; H04L 5/0042; H04L 5/0046; H04L 5/0048; H04L 1/0027; G01S 19/25; G01S 19/252; G01S 19/256; H04W 28/18; H04W 68/00; H04W 8/22

USPC .......... 370/254–350; 709/201–213; 455/453, 455/439, 436, 452.1
See application file for complete search history.

(56) References Cited

U.S. PATENT DOCUMENTS

| 5,539,924 A | 7/1996 | Grube et al. |
| 6,295,455 B1 | 9/2001 | Fischer et al. |

(Continued)

FOREIGN PATENT DOCUMENTS

| CA | 2533875 | 2/2014 |
| EP | 0961512 | 12/1999 |

(Continued)

OTHER PUBLICATIONS

Akyildiz, et al., "A Survey of Mobility Management in Next-Generation all-IP-based Wireless Systems", In *IEEE Wireless Communications*, vol. 11, Issue 4, (Aug. 2004), pp. 16-28.
(Continued)

*Primary Examiner* — Ayaz Sheikh
*Assistant Examiner* — Debebe Asefa
(74) *Attorney, Agent, or Firm* — Sonia Cooper; Jim Ross; Micky Minhas

(57) ABSTRACT

A mobile terminal, program and method for use in a communication system comprising a first, packet-based network and a plurality of wireless access networks providing access to the first network. The mobile terminal is configured to maintain a log of user habits in terms of past availability or use of one or more of the access networks, e.g. relative to time of day, week, month and/or year. The mobile terminal is further configured to control activation the transceiver to scan for subsequent availability of one or more of the wireless access networks, in dependence on the comparison of the one or more identified times with the current time. The mobile terminal switches between a first mode in which the scanning is controlled in dependence on the current geographical location of the mobile terminal, and a second mode in which the scanning is controlled in dependence on said log.

19 Claims, 3 Drawing Sheets

(51) Int. Cl.

| | | |
|---|---|---|
| *H04L 1/00* | (2006.01) | |
| *H04W 28/18* | (2009.01) | |
| *H04W 68/00* | (2009.01) | |
| *H04W 8/22* | (2009.01) | |
| *H04W 48/20* | (2009.01) | |
| *H04W 48/18* | (2009.01) | |
| *H04W 48/16* | (2009.01) | |
| *H04W 64/00* | (2009.01) | |
| *H04W 48/04* | (2009.01) | |

(52) U.S. Cl.
CPC ............... *H04L 1/0027* (2013.01); *H04W 8/22* (2013.01); *H04W 28/18* (2013.01); *H04W 48/16* (2013.01); *H04W 48/18* (2013.01); *H04W 68/00* (2013.01); *H04W 48/04* (2013.01); *H04W 64/00* (2013.01)

(56) References Cited

U.S. PATENT DOCUMENTS

| | | | |
|---|---|---|---|
| 6,389,285 B1 | 5/2002 | Escamilla et al. | |
| 6,433,735 B1 * | 8/2002 | Bloebaum et al. | 342/357.43 |
| 6,625,457 B1 | 9/2003 | Raith | |
| 6,748,439 B1 | 6/2004 | Monachello et al. | |
| 6,763,226 B1 | 7/2004 | McZeal, Jr. | |
| 6,829,481 B2 | 12/2004 | Souissi | |
| 6,862,277 B2 | 3/2005 | Pan et al. | |
| 6,925,378 B2 | 8/2005 | Tzamaloukas | |
| 7,016,326 B2 | 3/2006 | Holcman et al. | |
| 7,072,323 B2 | 7/2006 | Roberts et al. | |
| 7,072,657 B2 | 7/2006 | Watanabe et al. | |
| 7,197,569 B2 | 3/2007 | Dowling | |
| 7,248,858 B2 | 7/2007 | Barber et al. | |
| 7,251,488 B2 | 7/2007 | Chitrapu | |
| 7,251,490 B2 | 7/2007 | Rimoni | |
| 7,346,032 B2 | 3/2008 | Holcman et al. | |
| 7,382,756 B2 | 6/2008 | Barber et al. | |
| 7,385,947 B2 | 6/2008 | Wu et al. | |
| 7,466,986 B2 | 12/2008 | Halcrow et al. | |
| 7,499,705 B2 | 3/2009 | Rimoni et al. | |
| 7,583,632 B2 | 9/2009 | Janevski et al. | |
| 7,600,009 B2 | 10/2009 | Soininen et al. | |
| 7,623,486 B2 | 11/2009 | Caldwell et al. | |
| 7,646,710 B2 | 1/2010 | Christie, IV | |
| 7,646,745 B2 | 1/2010 | Caldwell et al. | |
| 7,706,796 B2 | 4/2010 | Rimoni et al. | |
| 7,873,352 B2 | 1/2011 | Nguyen et al. | |
| 7,912,978 B2 * | 3/2011 | Swildens et al. | 709/235 |
| 7,937,043 B2 * | 5/2011 | Wandel | 455/69 |
| 7,961,687 B2 | 6/2011 | Holcman et al. | |
| 8,107,457 B2 | 1/2012 | White et al. | |
| 8,107,954 B2 | 1/2012 | Islam et al. | |
| 8,145,135 B2 | 3/2012 | Dalsgaard et al. | |
| 8,270,948 B2 | 9/2012 | Oba et al. | |
| 8,489,108 B2 * | 7/2013 | Chan et al. | 455/453 |
| 8,638,760 B2 | 1/2014 | Jarzra et al. | |
| 8,644,142 B2 | 2/2014 | Christie, IV | |
| 8,666,399 B2 | 3/2014 | Kholaif et al. | |
| 2002/0026527 A1 | 2/2002 | Das et al. | |
| 2002/0087724 A1 | 7/2002 | Datta et al. | |
| 2002/0143971 A1 | 10/2002 | Govindarajan et al. | |
| 2002/0147008 A1 | 10/2002 | Kallio | |
| 2003/0108006 A1 | 6/2003 | Holeman et al. | |
| 2003/0108007 A1 | 6/2003 | Holeman et al. | |
| 2003/0118015 A1 | 6/2003 | Gunnarsson et al. | |
| 2003/0133425 A1 | 7/2003 | Radhakrishnan et al. | |
| 2003/0172145 A1 | 9/2003 | Nguyen | |
| 2003/0214958 A1 | 11/2003 | Madour et al. | |
| 2003/0219022 A1 | 11/2003 | Dillon et al. | |
| 2003/0227883 A1 | 12/2003 | Rimoni et al. | |
| 2004/0018829 A1 | 1/2004 | Raman et al. | |
| 2004/0023669 A1 | 2/2004 | Reddy | |
| 2004/0073642 A1 | 4/2004 | Iyer | |
| 2004/0081159 A1 | 4/2004 | Pan et al. | |
| 2004/0203848 A1 | 10/2004 | Kumar | |
| 2004/0205233 A1 | 10/2004 | Dunk | |
| 2004/0218605 A1 | 11/2004 | Gustafsson et al. | |
| 2005/0003835 A1 | 1/2005 | Riise et al. | |
| 2005/0037758 A1 | 2/2005 | Rimoni | |
| 2005/0048977 A1 | 3/2005 | Dorenbosch et al. | |
| 2005/0239461 A1 | 10/2005 | Verma et al. | |
| 2005/0245269 A1 | 11/2005 | Demirhan et al. | |
| 2005/0255856 A1 | 11/2005 | Griffin et al. | |
| 2006/0019653 A1 | 1/2006 | Stamoulis et al. | |
| 2006/0045056 A1 | 3/2006 | O'Hara, Jr. | |
| 2006/0092890 A1 | 5/2006 | Gupta et al. | |
| 2006/0135165 A1 | 6/2006 | Faccin | |
| 2006/0221901 A1 | 10/2006 | Yaqub et al. | |
| 2006/0232663 A1 | 10/2006 | Gandhi et al. | |
| 2006/0245408 A1 | 11/2006 | Lee et al. | |
| 2007/0008926 A1 | 1/2007 | Oba | |
| 2007/0049274 A1 | 3/2007 | Yacobi et al. | |
| 2007/0049276 A1 | 3/2007 | Rimoni et al. | |
| 2007/0076662 A1 | 4/2007 | Jain et al. | |
| 2007/0086378 A1 | 4/2007 | Matta et al. | |
| 2007/0117572 A1 | 5/2007 | Adam et al. | |
| 2007/0178933 A1 | 8/2007 | Nelson | |
| 2007/0184835 A1 | 8/2007 | Bitran et al. | |
| 2008/0031194 A1 | 2/2008 | Yaqub | |
| 2008/0049702 A1 | 2/2008 | Meylan et al. | |
| 2008/0112363 A1 | 5/2008 | Rahman et al. | |
| 2008/0161001 A1 | 7/2008 | Holcman et al. | |
| 2008/0170525 A1 | 7/2008 | Geiger | |
| 2008/0274715 A1 | 11/2008 | Heit et al. | |
| 2009/0005041 A1 | 1/2009 | Steinberg et al. | |
| 2009/0063174 A1 | 3/2009 | Fricke | |
| 2009/0124284 A1 | 5/2009 | Scherzer et al. | |
| 2009/0131084 A1 | 5/2009 | Comstock et al. | |
| 2010/0034133 A1 | 2/2010 | Marom et al. | |
| 2010/0103829 A1 | 4/2010 | Murzeau et al. | |
| 2010/0144371 A1 | 6/2010 | Savoor | |
| 2010/0172274 A1 | 7/2010 | Wu et al. | |
| 2010/0254346 A1 | 10/2010 | Jain et al. | |
| 2010/0291947 A1 | 11/2010 | Annamalai | |
| 2011/0013569 A1 | 1/2011 | Scherzer et al. | |
| 2011/0064058 A1 | 3/2011 | Rimoni et al. | |
| 2011/0085447 A1 | 4/2011 | Kholaif et al. | |
| 2011/0116479 A1 | 5/2011 | Jarzra et al. | |
| 2011/0124334 A1 | 5/2011 | Brisebois et al. | |
| 2011/0275378 A1 | 11/2011 | Kwon et al. | |
| 2011/0300865 A1 | 12/2011 | Kashikar et al. | |
| 2011/0310866 A1 | 12/2011 | Kennedy et al. | |
| 2012/0020296 A1 | 1/2012 | Scherzer et al. | |
| 2012/0096520 A1 | 4/2012 | Dutta et al. | |
| 2012/0150961 A1 | 6/2012 | Shatsky et al. | |
| 2012/0170560 A1 | 7/2012 | Han et al. | |
| 2012/0311016 A1 * | 12/2012 | Deanna et al. | 709/202 |
| 2013/0217414 A1 | 8/2013 | Nagaraj | |
| 2013/0308470 A1 | 11/2013 | Bevan et al. | |
| 2013/0310055 A1 | 11/2013 | Dewing et al. | |
| 2014/0003261 A1 | 1/2014 | Gillett et al. | |
| 2014/0003404 A1 | 1/2014 | Gillett et al. | |
| 2014/0004886 A1 | 1/2014 | Gillett et al. | |
| 2014/0040486 A1 | 2/2014 | Christie | |
| 2014/0242997 A1 | 8/2014 | Golan | |

FOREIGN PATENT DOCUMENTS

| | | |
|---|---|---|
| EP | 0967815 | 12/1999 |
| EP | 1124396 | 8/2001 |
| EP | 1924114 | 5/2008 |
| EP | 2051458 | 4/2009 |
| EP | 2112858 | 10/2009 |
| EP | 2282587 | 2/2011 |
| EP | 2418883 | 2/2012 |
| EP | 2475219 | 7/2012 |
| GB | 2481254 | 12/2011 |
| WO | WO-9817030 | 4/1998 |
| WO | WO-0010306 | 2/2000 |

(56) References Cited

FOREIGN PATENT DOCUMENTS

| WO | WO-0028751 | 5/2000 |
|---|---|---|
| WO | WO-2005011173 | 2/2005 |
| WO | WO-2007000391 | 1/2007 |
| WO | WO-2007103975 | 9/2007 |

OTHER PUBLICATIONS

Chen, Wen-Tsuen et al., "Active Application Oriented Vertical Handoff in Next-Generation Wireless Networks", *IEEE Communications Society, WCNC 2005*, (2005), pp. 1383-1388.

Chew, T Y., "The Integration of Positioning Technologies for Precise Location Identification", (Jan. 11, 2005), 138 pages.

Kim, Kyu-Han et al., "Improving Energy Efficiency of Wi-Fi Sensing on Smartphones", *IEEE Infocom 2001*, (2001), pp. 2930-2938.

McGuire, et al., "Estimating Position of Mobile Terminals with Survey Data", *In EURASIP Journal on Applied Signal Processing*, vol. 1, (Oct. 1, 2001), pp. 58-66.

Nicholson, Anthony J., et al., "BreadCrumbs: Forecasting Mobile Connectivity", *Proceedings of the 14th ACM international conference on Mobile computing and networking*, 2008, pp. 41-57.

Sun, Guolin et al., "Signal Processing Techniques in Network-aided Positioning", *IEEE Signal Processing Magazine*, Available at <http://www.cspl.umd.edu/sig/publications/sun_survey_200507.pdf>,(Jul. 2005), pp. 12-23.

Zimmerman, et al., "Database Correlation for Positioning of Mobile Terminals in Cellular Networks using Wave Propagation Models", *In IEEE 60th Vehicular Technology Conference*, vol. 7, (Sep. 26, 2004), pp. 4682-4686.

"HF Transceiver CODAN NGT SRx .", Retrieved at <<http://hf-ssb-transceiver.at-communication.com/en/codan/hf_ssb_transceiver_ngtsrx.html>>, Apr. 1, 2010, pp. 9.

"International Search Report and Written Opinion", Application No. PCT/US2013/048009, Dec. 11, 2013, 9 pages.

"BPAI Decision", U.S. Appl. No. 11/313,048, Nov. 19, 2013, 11 pages.

"Examiners Answers to Appeal Brief", U.S. Appl. No. 11/313,048, Sep. 29, 2010, 13 Pages.

"Final Office Action", U.S. Appl. No. 10/628,167, May 9, 2008, 11 pages.

"Final Office Action", U.S. Appl. No. 11/313,048, Oct. 20, 2014, 12 pages.

"Final Office Action", U.S. Appl. No. 11/313,048, Nov. 5, 2009, 10 Pages.

"Final Office Action", U.S. Appl. No. 12/685,486, Nov. 5, 2012, 24 pages.

"Final Office Action", U.S. Appl. No. 13/668,116, Sep. 25, 2014, 10 pages.

"Foreign Notice of Allowance", CA Application No. 2,533,875, Oct. 11, 2013, 2 Pages.

"Foreign Office Action", CA Application No. 2,533,875, Feb. 27, 2012, 3 pages.

"Foreign Office Action", CA Application No. 2,533,875, May 13, 2013, 3 pages.

"Foreign Office Action", CA Application No. 2,836,894, Sep. 22, 2014, 2 Pages.

"International Search Report and Written Opinion", Application No. PCT/US2014/018130, Jun. 2, 2014, 11 pages.

"International Search Report", Application No. PCT/IB2004/002415, Jan. 25, 2005, 2 pages.

"Non Final Office Action", U.S. Appl. No. 11/313,048, Mar. 31, 2009, 9 Pages.

"Non-Final Office Action", U.S. Appl. No. 10/628,167, Jul. 6, 2007, 9 pages.

"Non-Final Office Action", U.S. Appl. No. 10/628,167, Nov. 17, 2008, 11 pages.

"Non-Final Office Action", U.S. Appl. No. 10/628,167, Dec. 26, 2007, 8 pages.

"Non-Final Office Action", U.S. Appl. No. 11/313,048, Jan. 28, 2014, 11 pages.

"Non-Final Office Action", U.S. Appl. No. 12/685,486, Jun. 7, 2012, 5 pages.

"Non-Final Office Action", U.S. Appl. No. 13/666,719, Jun. 4, 2014, 60 pages.

"Non-Final Office Action", U.S. Appl. No. 13/666,739, Jun. 16, 2014, 28 pages.

"Non-Final Office Action", U.S. Appl. No. 13/668,116, Apr. 21, 2014, 12 pages.

"Notice of Allowance", U.S. Appl. No. 10/628,167, Aug. 28, 2009, 4 pages.

"Notice of Allowance", U.S. Appl. No. 12/685,486, Jun. 7, 2013, 10 pages.

"Notice of Allowance", U.S. Appl. No. 12/685,486, Sep. 25, 2013, 9 pages.

"Supplementary European Search Report", EP Application No. 04769100.1, Oct. 7, 2011, 3 pages.

"Written Opinion", Application No. PCT/IB2004/002415, Feb. 2, 2005, 6 pages.

Zhao, et al., "Handshake Time and Transmission Rate of 802.11g Measurement in Vehicular Networks", IEEE 35th Conference on Local Computer Networks (LCN), Oct. 10, 2010, pp. 730-736.

"Non-Final Office Action", U.S. Appl. No. 14/045,524, Dec. 10, 2014, 13 pages.

"International Search Report and Written Opinion", Application No. PCT/US2013/047734, (Sep. 30, 2013),12 pages.

"International Search Report and Written Opinion", Application No. PCT/US2013/047448, (Sep. 23, 2013),15 pages.

"International Search Report and Written Opinion", Application No. PCT/US2013/047736, (Oct. 11, 2013),10 pages.

"Final Office Action", U.S. Appl. No. 13/666,739, May 20, 2015, 26 pages.

"Final Office Action", U.S. Appl. No. 14/045,524, Mar. 19, 2015, 16 pages.

"Non-Final Office Action", U.S. Appl. No. 11/313,048, Apr. 14, 2015, 13 pages.

"Non-Final Office Action", U.S. Appl. No. 13/781,706, Apr. 2, 2015, 17 pages.

"Notice of Allowance", U.S. Appl. No. 13/668,116, Mar. 20, 2015, 4 pages.

"Supplemental Notice of Allowance", U.S. Appl. No. 13/668,116, Apr. 23, 2015, 2 pages.

\* cited by examiner

DETERMINING AVAILABILITY OF AN ACCESS NETWORK

RELATED APPLICATION

This application claims priority under 35 USC 119 or 365 to Great Britain Application No. 1211565.5 filed 29 Jun. 2012, the disclosure of which is incorporated in its entirety.

BACKGROUND

Some communication systems allow the user of a mobile terminal to conduct voice or video calls over a packet-based computer network, e.g. over an internetwork such as the Internet. Such communication systems include voice or video over internet protocol (VoIP) systems. These systems are beneficial to the user as they are often of significantly lower cost than conventional fixed-line or mobile networks, particularly for long-distance communication. Other types of communication media that can be implemented over a packet-based network include instant messaging ("IM"), SMS messaging, file transfer and/or voicemail.

When conducting communications such as VoIP calls over a first, packet-based network like the Internet, a mobile terminal typically connects to the Internet via a second, access network (which may also be packet-based in nature). If available, it is often possible to select between multiple different access networks. Typically a mobile terminal has two different types of connections available: wireless local area network (WLAN) and wireless wide area network (WWAN). Many WLANs typically use wi-fi, but other local, short-range wireless standards are also known in the art. The WWAN can be implemented by a number of different technologies such as GPRS, UMTS, HDPA, LTE, Wimax, etc. Usually, the type of WWAN available is decided by the operator, and as such the decision to make at the mobile terminal boils down to whether to use WLAN, WWAN, or both. On top of WLAN and WWAN, certain mobile terminals may have access to a satellite link as a third access technology, though this is usually a "last resort" if neither WLAN nor WWAN is accessible. In some systems it may also be possible to take into account a users' physical location in deciding whether to move to a network connection using a different wireless internet access technology.

To be able to choose which network to connect to, e.g. to select between WLAN or WWAN, or to select between two or more overlapping WLANs, the mobile terminal needs to know which networks are physically present and in operation. To do this the mobile terminal powers up its wireless interface or interfaces and listens for paging signals from potential networks. So if a mobile terminal comprises a short-range, local transceiver for communicating with a local area wireless network such as a wi-fi network, this is powered-up to listen for paging signals broadcast from the access points of any available WLANs; and if the mobile terminal comprises a longer-range cellular transceiver for communicating with a wide area wireless network such as a 3G or LTE network, this is powered-up to listen for paging signals from the base stations of the user's one or more WWAN providers. The relevant interface may then be powered down after a certain listening duration. This kind of process may be referred as a scan. Conventionally such scans are performed periodically, e.g. every few seconds or minutes, so that the mobile terminal always knows roughly what networks are available.

SUMMARY

Embodiments of the present invention provide a mobile terminal for use in a communication system comprising a first, packet-based network and a plurality of wireless access networks providing access to the first network. The mobile terminal comprises: one or more transceivers for connecting to the wireless access networks; a positioning module arranged to determine a current geographical location of the mobile terminal; and processing apparatus coupled to the positioning module and the one or more transceivers, operable to communicate with the first network by forming connections with the wireless access networks using the one or more transceivers. The processing apparatus is configured to maintain a log of past availability to said mobile terminal or past use by said mobile terminal of one or more of said wireless access networks. The processing apparatus is also configured to control activation of at least one of the one or more transceivers to scan for subsequent availability of one or more of the wireless access networks. Further, the processing apparatus is configured to switch between (i) a first mode of operation in which said scanning is controlled in dependence on the current geographical location of the mobile terminal as determined by the positioning module, and (ii) a second mode of operation in which said scanning is controlled in dependence on said log.

Embodiments of the invention also provide a corresponding method and computer program product.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

For a better understanding of the described embodiments and to show how it may be put into effect, reference is made by way of example to the accompanying drawings in which.

DETAILED DESCRIPTION

Figure 1:
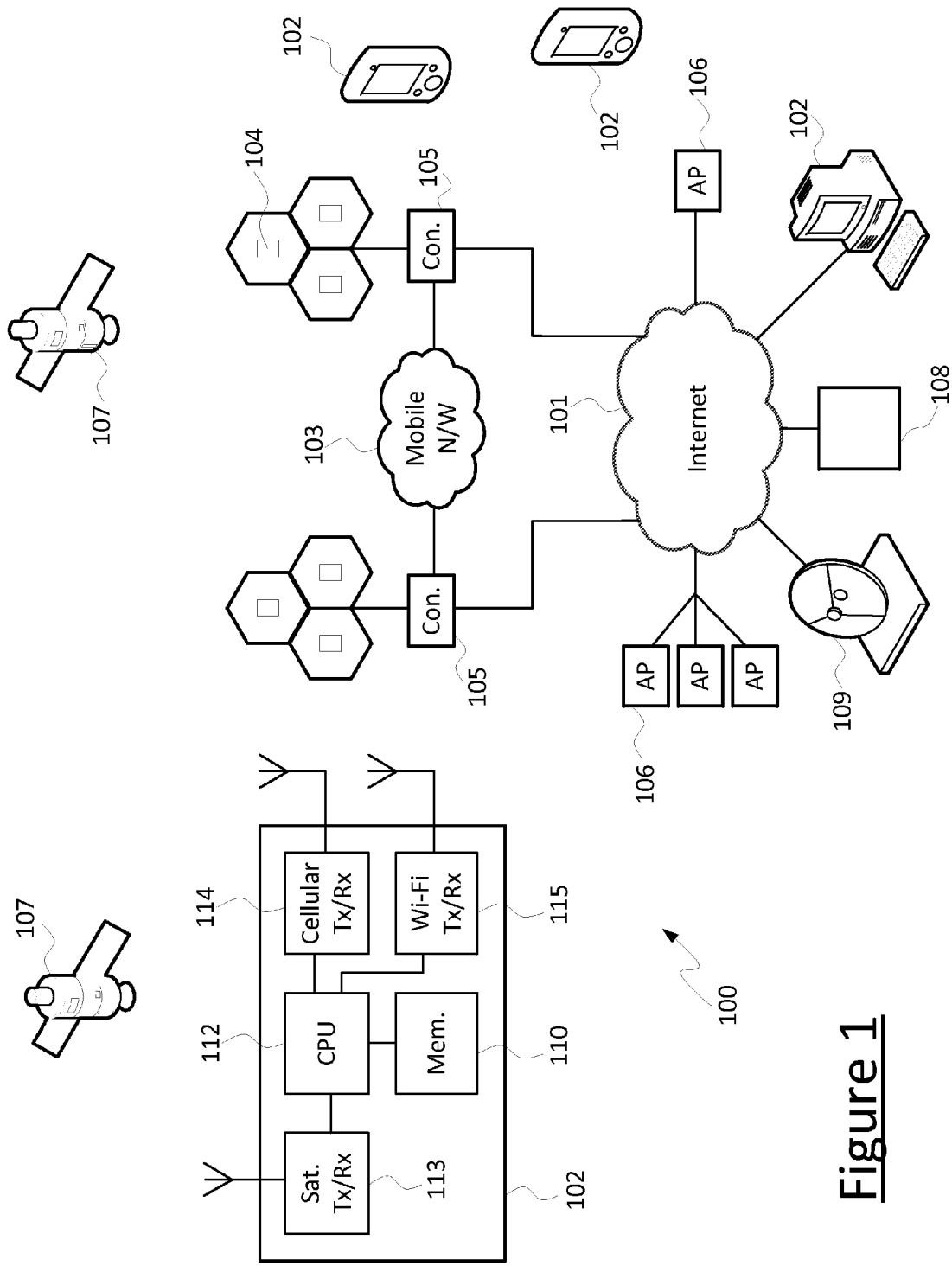
FIG. 1 is a schematic representation of a communication system.

As mentioned, a mobile terminal will power up its wireless interface or interfaces and listen for paging signals from potential networks in order to determine which networks are present, and thereby choose which network to connect to (e.g. to select between WLAN or WWAN, or between two or more overlapping WLANs). One issue with scanning is that it consumes a certain amount of power due to powering up the relevant interface, and therefore the process can have an effect on the battery life of a mobile terminal. It would desirable to provide a way of determining when networks are expected to be available, so as to determine when to spend battery power on performing scans for access networks such as WLAN networks.

One way to do this is to use a positioning module such as a GPS module to determine a current location of the mobile terminal, and to control the scanning in dependence on its current location. For example, it may be possible for the mobile terminal to query a look-up table of WLAN and/or WWAN coverage (e.g. either maintained locally at the mobile terminal or maintained at a location services server). The mobile terminal may use the look-up to determine that, based on its current location, it is currently in a geographic area where WLAN and/or WLAN coverage is expected or conversely not expected. The mobile terminal can then decrease scanning if it finds itself in an area where coverage is not expected or an area where a change in coverage is not expected, or increase scanning if it moves into an area when new coverage is expected. However, the acts of using the GPS transceiver (or the like) and/or accessing a location services database may themselves consume a certain amount of power.

The various embodiments provide a mobile terminal configured to observe past availability to said mobile terminal of one or more of said wireless access networks, and/or observe past use of the one or more access networks (if a network was used it must have been available, but an available network is not always used). Based on said observation, the mobile terminal maintains a log of user habits in terms of the past availability of one or more access networks from the perspective of that mobile terminal, or in terms of past use of one or more of the access networks by the mobile terminal. The availability or use is recorded in the log against the time at which the availability was encountered, preferably on a timescale appropriate to a user's typical routine, in terms of the time of day, week, month and/or year. The mobile terminal then controls activation of at least one of its transceivers to scan for subsequent availability of one or more of the wireless access networks, in dependence on the log of user habits relative to the present time. Embodiments of the invention can be implemented by computer program product embodied on a computer-readable hardware storage medium. A "computer-readable hardware storage medium" is intended to cover all forms of statutory computer-readable media. As such, a "computer-readable hardware storage medium" is not intended to cover non-statutory forms of media such as signals or carrier waves.

For example the mobile terminal may be configured to identify one or more times of day, week, month and/or year in which a difference in the availability is estimated to have occurred on a habitual basis, and to compare the one or more identified times with a current time of day, week, month and/or year. The scanning can then be controlled in dependence on the comparison of the current time with the one or more identified times.

Thus the mobile terminal is able to look for behavioural patterns—e.g. when during the week is the user found in the vicinity of certain networks—and to set the network scanning frequency or otherwise control the scanning regime in dependence on the user's habits and the time of day (and/or week, month or year).

For example consider a user who goes to work every weekday around 9 am and arrives back home around 6 pm. If he or she has a preferred wi-fi network at work and another one at home, the mobile terminal can learn that the user tends to access new networks around these two times of day and increase scanning frequencies around those times, and/or reduce scanning around times when it is determined that no changes in network availability are likely to occur.

Further, the mobile terminal is configured to be able to switch between two different modes of operation for controlling the scanning: in a first mode the mobile scans in dependence on the current location of the mobile terminal (e.g. as determined by the GPS), and in the second mode the scanning is controlled in dependence on the log of user habits. In embodiments, the habit-based scanning of the second mode may replace the position based scanning of the first mode, such that the position is not used to control scanning in the second mode (and optionally vice versa such that the log of habits is not used in the first mode).

This ability to switch between the two different modes for controlling scanning may have a number of different advantages. For example, whilst the habit-based scanning may be preferred, a sufficient log may not always be available. This could be the case if the user has not yet had time to build up a sufficient record of past habits to usefully control scanning, e.g. when the terminal is new out of the box, has been reset to factory settings, or the user has relocated permanently to a new area or adopted a new way of life. Alternatively or additionally, it may be possible to detect that the user is outside of a normal geographic area (such as the user's home town, region or country, e.g. because he or she is on holiday) and therefore the log of habits may not presently be applicable. In these scenarios the mobile terminal may revert to the position-based scanning method. Further, when the position-based scanning is not needed, power may be saved through reduced usage of the GPS module (or the like) or reduced need to query a localization service database. In some embodiments, in order to save power the mobile terminal may be configured to switch off the GPS module or put it into some other reduced power state when in the second, habit-based mode.

Preferably the processing apparatus of the mobile terminal is configured to perform the switching automatically, e.g. to automatically switch to the habit based mode when it detects that a sufficient log has been built up, or to automatically switch between the modes in dependence on whether the mobile terminal is detected to be in a geographic area where the log is applicable. In alternative embodiments however, the user could be given the option to switch manually, or there could be provided a user setting to choose between an automatic or manual mode, and/or to disable one or both of the modes.

FIG. 1 is a schematic illustration of a communication system 100 comprising a plurality of communication networks. The plurality of networks comprises a first, packet-switched network 101; preferably a predominantly-wired, wide area internetwork such as the Internet. Connected to the first network 101, the plurality of networks further comprises at least one wireless wide area network (WWAN) and a plurality of wireless local area networks (WLANs).

The at least one WWAN preferably comprises a mobile cellular network 103. The mobile cellular network 103 comprises a plurality of base stations 104 (sometimes referred to as node Bs in 3GPP terminology) operating according to a longer range wireless access technology. Each base station 104 is arranged to serve a corresponding cell of the cellular network 103.

Each of the WLANs comprises one or more local, short-range wireless access points 106 such as wi-fi access points operating according to a shorter range wireless access technology. In some cases, a WLAN may be formed of only a single access point 106 (and whatever mobile user terminals are connected to it at the time).

WLAN and WWAN are terms that will be familiar to a person skilled in the art. A wireless local area connection uses a different kind of radio technology than a wireless wide area connection.

In most territories, local area wireless technologies are configured to operate on unlicensed frequency bands whereas wide area wireless technologies are configured to operate on licensed frequency bands.

Further, local area technologies are designed to form short-range connections over a range of the order of tens of meters, e.g. each access point covering a radius smaller than about 100 m or 200 m. For example a WLAN is typically arranged to cover a region corresponding to the size of a room, building, office, shop, cafe or such like.

Wide area technologies on the other hand are designed to form connections over a range of the order of hundreds of meters or kilometers, e.g. each base station covering a cell of radius greater than 200 m, 500 m or 1 km. For example a cell typically corresponds to a region the size of several streets or a village, and the network itself is arranged to cover a region corresponding to the size of a town, city, county, state or country or even crossing boundaries between countries.

Examples of WWANs include LTE (Long Term Evolution), W-CDMA (Wideband Code Division Multiple Access), GSM (Global System for Mobile Communications), UMTS (Universal Mobile Telecommunications System), UTRAN (Universal Terrestrial Radio Access Network), HSPA (High Speed Packet Access), CDMA2000 or other 3GPP ($3^{rd}$ Generation Partnership Project) networks; WiMAX networks, CDPD (Cellular Digital Packet Data) networks and Mobitex networks. Other WWAN technologies may be familiar to a person skilled in the art.

Examples of WLANs include wi-fi networks, a HiperLAN networks, HomeRF networks, OpenAir networks and Bluetooth networks. Other WLAN technologies may be familiar to a person skilled in the art.

For illustrative purposes, the following will be described in terms of a 3G network and a plurality of wi-fi networks providing access to the Internet 101, but it will be appreciated that the teachings herein can apply to any one or more wide area wireless networks and any local area wireless networks for providing access to any further packet-based network, preferably a predominantly-wired wide area internetwork.

Still referring to FIG. 1, a plurality of user terminals 102 are arranged to communicate over the networks 101, 103 and/or 106. At least some are mobile user terminals which may comprise for example laptop computers, tablets or mobile phones. Each user terminal 102 comprises one or more transceivers for accessing the one or more networks 101, 103, 106.

Each of the mobile user terminals 102 comprises a short-range wireless transceiver (e.g. wi-fi) for accessing the Internet 101 via the wireless access points 106. In some places, a WLAN may be formed of a single short-range access point 106. In other places, small numbers of access points 106 may be connected together to form a WLAN connecting to the internet 101 through shared local area network equipment. Either way, a mobile terminal 102 connecting to one of the local access points 106 is provided with a route for accessing the Internet 101.

Further, each mobile user terminal 102 typically comprises a cellular wireless transceiver 114 for accessing the mobile cellular network 103 via the base stations 104. Access to the Internet 101 may be achieved by means of the base stations 104 of the cellular WWAN 103, e.g. using a mobile packet technology such as GPRS (General Packet Radio Service) or HSPA (High Speed Packet Access). At a higher level of the cellular hierarchy, the cellular network 103 comprises a plurality of cellular controller stations 105 each coupled to a plurality of the base stations 104. The controller stations 105 are coupled to a traditional circuit-switched portion of the mobile cellular network 103 but also to the Internet 101. The controller stations 105 are thus arranged to allow access to packet-based communications via the base stations 104, including access to the Internet 101. The controller stations 105 may be referred to for example as Base Station Controllers (BSCs) in GSM/EDGE terminology, or Radio Network Controllers (RNCs) in USTM or HSPA terminology.

As mentioned, the cellular and short-range wireless transceivers are typically arranged to operate on radio frequencies (RF), with the cellular wireless transceiver 114 typically being arranged to operate on a licensed RF band and the short-range wireless transceiver 115 being arranged to operate on an unlicensed RF band.

An alternative or additional WWAN that may be available in some systems is provided by satellite hub 109 connected to the internet 101. The satellite WWAN may provide yet another route enabling the mobile terminal 102 to access the internet 101 via a satellite transceiver of the mobile terminal 102, typically as a back-up if the other routes via the cellular WWAN or the WLANs fail or are unavailable. Each mobile user terminal 102 may therefore also comprise a satellite transceiver 113 for accessing the Internet 109 via one or more satellites 107 and the satellite hub 109.

Each user terminal 102 further comprises a memory 110 such as an electronic erasable and programmable memory (EEPROM, or "flash" memory); and a processor 112 coupled to the memory 110, cellular wireless transceiver 114 and short-range wireless transceiver 115. The memory 110 stores communications code arranged to be executed on the processor 112, and configured so as when executed to engage in communications over the Internet 101 and/or cellular network 103. The communications code may comprise signal processing code for transmitting and receiving signals over the wireless cellular network 103 via the cellular wireless transceiver 114 (and/or some or all of this functionality may be implemented in the cellular transceiver 114, though the increasing trend is for at least some of the signal processing to be performed in software). Further, the communications code preferably comprises a communication client application for performing communications such as live, packet-based voice or video calls with other user terminals 102 over the Internet 103, preferably via the short-range wireless transceiver 115 and wireless access points 106; and/or via the cellular wireless transceiver 114, base stations 104 and controller stations 105 of the cellular network 103 as discussed above. However, one or more of the user terminals 102 involved could alternatively communicate via a wired modem, e.g. in the case of a call between a mobile terminal and a desktop PC.

The processing apparatus 112 on the mobile terminal 102 will be arranged to perform scanning processes via its local transceiver 115 and cellular transceiver 114, to scan for availability of WLANs and the WWAN respectively. This means the communication client application running on the processing apparatus 112 can be kept aware of what networks are available for internet access, and hence select one of the WLANs or select between a WLAN and WWAN as a means for accessing the Internet 101, e.g. for performing a real-time VoIP call with another user terminal 102 over the internet 101. Other examples are to view a website or send an email via a server of the Internet 101, or send or receive an IM message or file transfer to or from another user 102. In embodiments the scanning process may be used to enable handover during an ongoing communication, e.g. to handover mid VoIP call or during a file transfer.

Figure 3:
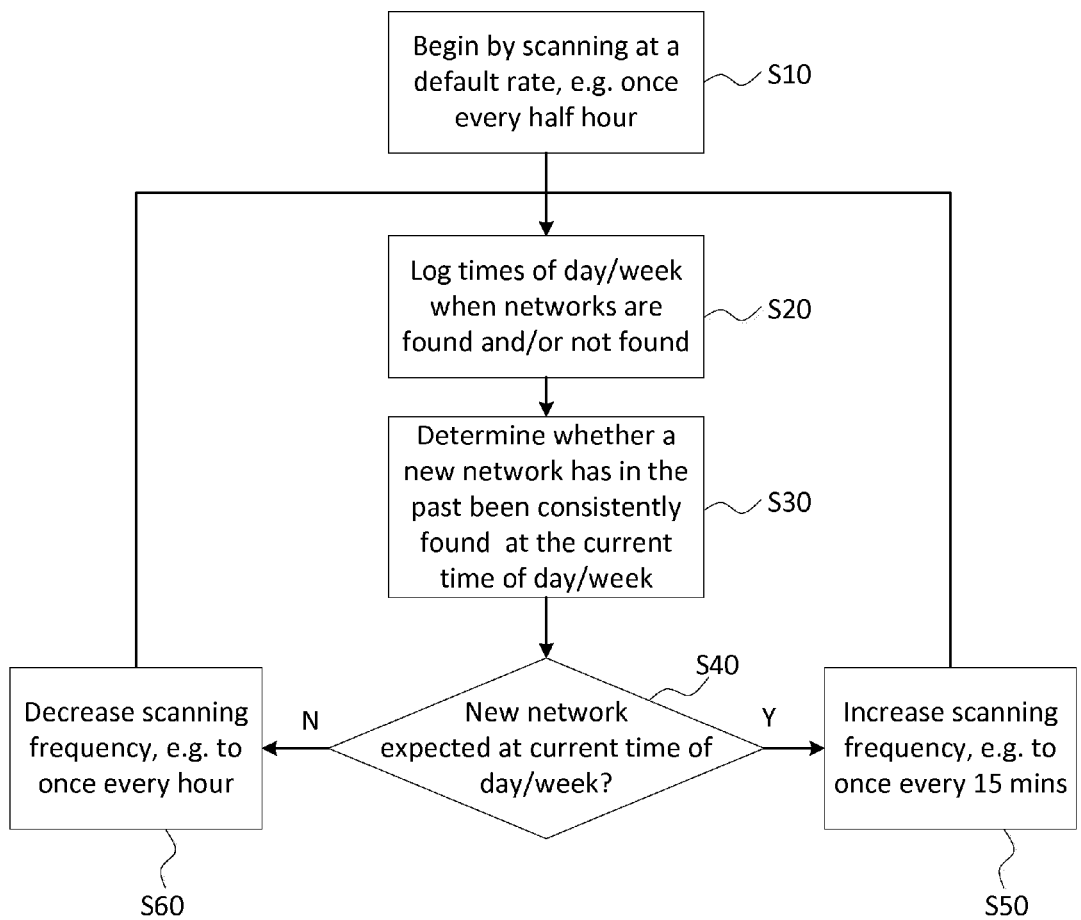
FIG. 3 is a flow-chart schematically representing a habit-based scanning method.

The client application running on the processing apparatus 112 of the mobile terminal 102 is configured to control the scanning process based on a log of the user's past behavior. An example is given in the flow chart of FIG. 3.

The process begins at step S10 with no prior information regarding the user's behavior. For example the mobile terminal 102 may be new out of the box or has just been reset to factory settings. In embodiments the client may also provide the user with the option to erase some or all of the log, for example when the user moves house or apartment or takes a job in a new area so that he or she adopts a fresh set of habits.

At this initial stage with no (or substantially no) log yet compiled, the client is preferably configured to operate the local transceiver 115 to scan according to a default position-based regime (discussed later). Each scan powers up the transceiver 115 for a certain amount of time to listen for any available WLANs, e.g. any available wi-fi access points 106. The technique for performing a scan will in itself be familiar to a person skilled in the art.

If the client finds a new network as a result of the scan, it may instigate a handover. For example, if the mobile terminal 102 is currently connected to the Internet 101 via a WWAN (e.g. the packet service of the user's 3G network or other such mobile cellular network), but then a new WLAN is found to become available, then the client may instigate a handover to switch to using the WLAN as the means for access in the Internet 101. This may be based on an assumption that a WLAN is always a better choice than a WWAN, as WLANs tend to be cheaper per unit data or per unit time for accessing the Internet 101. Alternatively the decision may be based not only on whether or not the WLAN is available, but on a comparison of whether the WLAN or WWAN offers the better quality (e.g. in terms of bandwidth, delay, jitter, error rate and/or reliability). The quality could be measured dynamically by the client on the mobile terminal 102, each time as and when it makes a handover decision; or alternatively a measure of expected quality could be looked up from a table of past user experience maintained on the mobile terminal 102 or a server (e.g. 108).

In another scenario, if it is currently connected to the Internet 101 via a WLAN but now finds a new WLAN that is closer, cheaper and/or has a better connection quality, it may instigate a handover to switch from the current WLAN to the new WLAN as the means for accessing the Internet 101. Again the determined quality could comprise bandwidth, delay, jitter, error rate and/or reliability; and could be measured dynamically at the time of a handover decision or determined from a look-up table of past measurements.

Either way, if there is a current communication ongoing at the time of scanning and finding a new network, e.g. the user is in the middle of a VoIP call via the current WWAN or WLAN, note that the client may be configured to automatically hand over during that ongoing communication, e.g. mid call. The user need not know that a handover has occurred (except perhaps in that they now experience a better quality or cheaper connection). However, in other embodiments it is not ruled out that the user is presented with a manual option to control handover (.e.g. the user is presented with a list of available networks from which he or she can choose).

In addition to the using the results of the scans to inform the immediate handover decision, the client application running on the mobile terminal 102 is also configured to log times during the user's routine at which networks have been found available (and/or equivalently, when not found to be available). This is represented at step S20 of FIG. 3.

The log is preferably stored at the mobile terminal 102 itself, on a storage device (e.g. 110) of the mobile terminal. However, it is not excluded that the mobile terminal 102 could maintain the log by uploading results to a server (e.g. 108) from which it can later access them.

The results are preferably recorded in the log in terms of a human timescale. I.e. the time values in the log are recorded as values of a scale that is representative of a user's typical, recurring routine, being cyclical in nature over a period in which repeated user habits typically occur—namely as a time of day, week, month and/or year at which the networks have been found available. Hence if a network is found to be available at a certain time, and then subsequently found again at the same time within a subsequent cycle (e.g. subsequent day or week), then this will be recorded in terms of the same time value (e.g. same minute or hour of the day, or same day of the week). Preferably the time values used to record network availability in the log comprise at least times of day, and more preferably also times of week.

In embodiments the entries may represent times when the network was not only found to be available, but also was actually used by the user to conduct network traffic.

The entries in the log may comprise identifiers of networks or their access points mapped against the times of day, week, month and/or year at which they were found or used. Alternatively the log entries may just record the fact that a change in network availability or usage occurred at certain times of day, week, month and/or year.

The time values in the log may be quantized, e.g. into 15 minute bins, so that networks can be identified as having occurred at the same time within the day (or week, month or year) if they fall into the same bin. However in other embodiments un-quantized time values may be recorded and instead an error margin applied at later stage when the entries in the log are actually used to control scanning.

Figure 2:
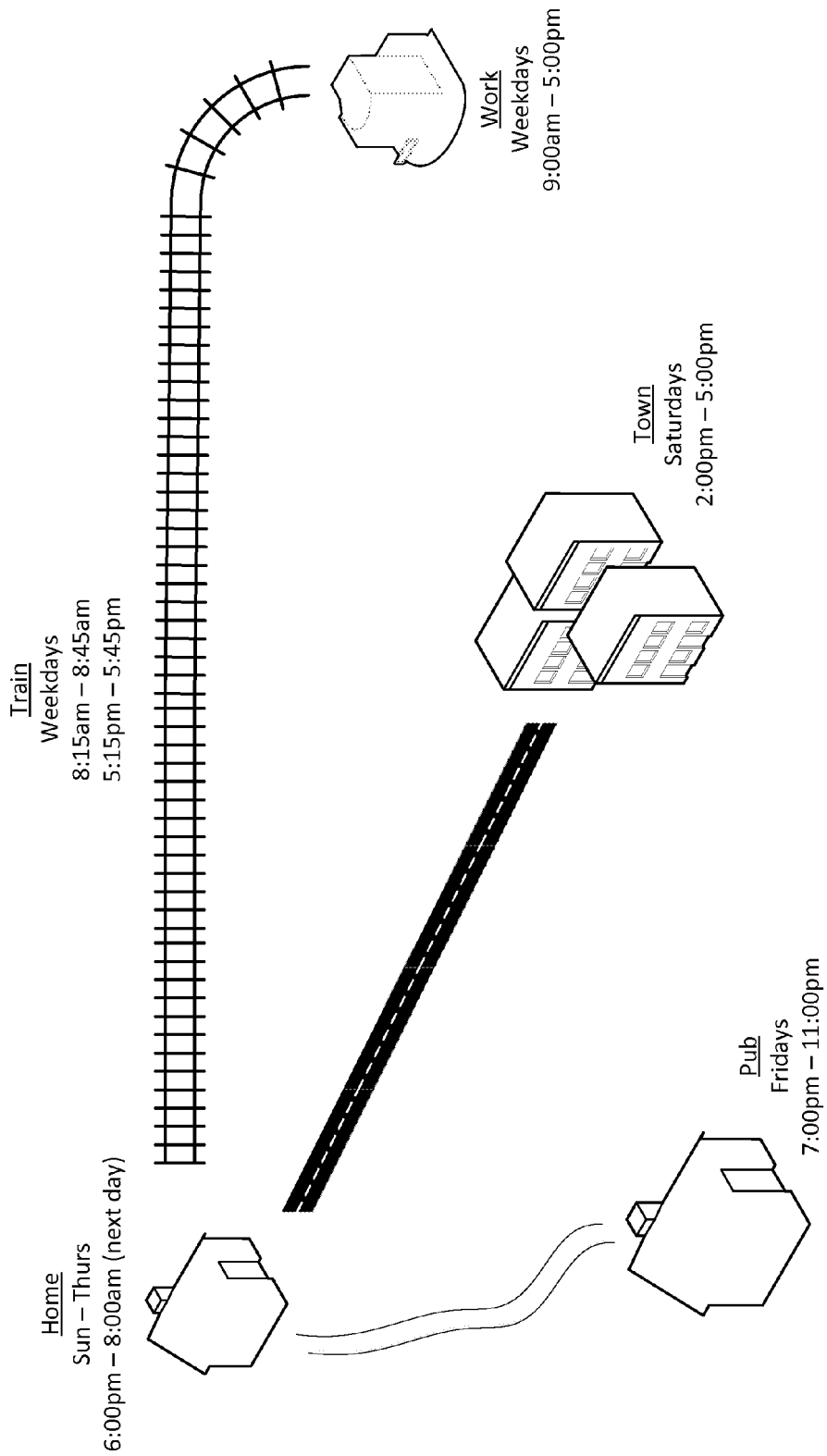
FIG. 2 is a schematic representation of an example user's habits.

An example of a user's typical routine is shown schematically in FIG. 2.

The user of FIG. 2 has a regular "9 to 5" job, therefore tends to leave home around 8 am and return home about 6 pm in the evening most weekdays (with a typical commute of 1 hour). This means the user may tend to be found in his or her house or apartment between 6 pm and 8 am the next day Sunday to Thursday, where the user will have a home WLAN available. As the client running on the user's mobile terminal 102 has been logging the network availability or usage over a period of at least a week (and preferably multiple weeks), it will therefore have logged a recurrence of an available network around these times (either by logging the home network ID against the times of day when it has been found in the window between 6 pm and 8 am, or by logging the fact that a new network has been found around the threshold times of 6 pm and 8 am).

Similarly, the user may be found in the vicinity of an on-board train WLAN during commuting times of 8:15 am-8:45 am and 5:15 pm-5:45 pm most weekdays. The client will therefore have logged the network IDs of the train WLAN and work WLAN during these times respectively, or logged the fact that there was a change in network availability or usage around these times.

The user may also have other habits at weekends, making it desirable to maintain a log over at least a week and to record the availability or usage in terms of a time of day and week.

For example, in FIG. 2 the user typically visits his or her local pub most Friday evenings, e.g. from approximately 7 pm-11 pm. The pub may have a WLAN available for its customers, and this may also be reflected in the log. Similarly, perhaps the user often visits the local town centre most Saturday afternoons, e.g. from approximately 2 pm to 5 pm. This may result in the availability or use of one or more further WLANs, e.g. installed in a shopping centre for use by customers. Again the network availability or usage and associated time values will be recorded in the log.

Other times of day or week may have no regular habits associated with them. For example, the user may enjoy no one consistent activity during Sunday daytimes. At these times no consistent entries will be found in the log.

Once the log begins to be compiled over a sufficient length of time (e.g. after multiple days or weeks) or has accumulated sufficient entries, it can be used by the client application running on the processing apparatus 112 of the mobile terminal 102 to control whether or when to scan for the availability of alternative access networks (WLAN or WWANs) for accessing the internet 101, with a view to potentially handing over between access networks. For example, the log can be used to determine when a mobile terminal 102 currently connected to the internet 101 via a WWAN such as a 3G mobile cellular network should scan for availability of a WLAN such as a wi-fi network, so as to potentially handover to the WLAN. Or the log may be used to determine when a mobile terminal 102 currently connected to the internet 101 via a WLAN should scan for the availability of an alternative WLAN, so as to potentially hand over to the alternative WLAN. As mentioned, this could be used to handover during a VoIP call or other internet communication such as an IM chat session or file transfer. As will be discussed, preferably the determination about when to scan comprises varying the rate of scans from depending on the user's habits as they build up in the log, e.g. either increasing or decreasing the rate relative to the initial default rate (or current rate).

To this end, at step S30 the client running on the mobile terminal 102 determines the current time of day and/or week, and compares this to the entries in the log in order to identify whether any new networks are expected to become available at the current time of day and/or week based on the user's past habits. "New" here means relative to the network(s) currently available or being used for access the Internet 101 (or such like), not new in an absolute sense. E.g. the home network is considered "new" each day when it is encountered again on return from work, even though it may have been regularly used at home for many months or years. That is, it is new in the day's cycle. A new network will only be identified as expected if it has in some way been available consistently in previous days and/or weeks (or even months and/or years), i.e. on a habitual bases. A one-off occurrence is not enough. In embodiments the minimum standard for habitual basis may be set to at least two occurrences in a given time bin or within a given error margin, although embodiments with a stricter standard than two occurrences are also possible.

The method then branches at step S40 depending on the outcome of this comparison.

The client is preferably configured to control the local transceiver 115 to adjust the rate in dependence on the past habits found from the log.

If it is determined that a new network (i.e. other than the one the client on the mobile terminal 102 is currently using to access the Internet 101) is likely to be available based on the user's past habits as reflected in the log, e.g. if a new network has consistently been or become available or been used around this time of day and week in the past, the method may branch to step S50 where the client increases the rate at which it controls the local transceiver 115 to scan for potentially available WLANs. Alternatively step S50 may comprise leaving the scan at its current rate if already set to a higher rate.

If on the other hand it is determined that a new network is not likely to be available based on the log, e.g. if a new network has not consistently been or become available or been used around this time of day and week in the past, the method may branch to step S60 where the client decreases the rate at which it controls the local transceiver 115 to scan for potentially available WLANs. Alternatively step S60 may comprise leaving the scan at its current rate if already set to a lower rate.

If at any point as a result of the scan the client finds a new network that it or its user would prefer to use (e.g. taking into account quality and/or price considerations), it may instigate a handover in the same manner as described in relation to step S10. For example this may result in handing over from a WWAN to a WLAN or handing over between two WLANs as a means for accessing the Internet 101.

In some embodiments, the control of the scanning may comprise identifying time a window (a duration of time) in which a network is expected to be available or not available, and setting the rate to stay high or low for the duration of the window. For example referring to FIG. 2, the client may identify from the log that the home network is usually available or used between 6 pm and 8 am the next day, and may be configured to set the scanning to a higher rate for the duration that the current time meets the condition of being between 6 pm and 8 am.

An additional or alternative condition that may be applied is that the scanning frequency is set to or remains at the (or a) higher rate on condition that the mobile terminal 102 is not already connected to the expected network (so the rate lowers when the expected network is indeed found).

Note that in embodiments scanning frequencies are not necessarily varied in fixed steps up and down from a default, but can be regulated as a continuous (as opposed to discrete-valued) parameter. Such a mechanism may be described as follows. The scanning frequency F is a function of the probability P that a better/more preferred network is available:

$$F=f(P)$$

where f is an non-decreasing function, i.e. the higher the probability, the more frequent the scan.

In turn, P is a function of at least:
the habitual history, and
the current time.

The more observations the habitual pattern consists of, and the stronger the pattern in it, the higher the P. Yet, having seen a network becoming available at a certain time of day only once may increase P very slightly as compared to never having seen it.

As an optional extension of the embodiments using a continuous frequency F, the probability P may also depend on one or both of the following.

The network currently connected to (i.e. if the network likely to be available is the one currently connected to there is no need to scan). This may be included as a variable of P without much loss of generality.

"Failed scans", so if the result of scans does not match the expectation, the use of habitual patterns may be suspended until they return to normal. This is a way to determine abnormal behavior, e.g. vacations.

In alternative embodiments, the control may comprise identifying a point in time at which a change is likely to occur, i.e. a time threshold, and triggering a step up or down in rate at the identified point in time. For example referring to FIG. 2, the client may identify that a change in network availability usually occurs around 6 pm, and may be configured to trigger an increase in scanning rate when it is detected that the current time reaches the threshold of 6 pm. In some embodiments, the scanning could be left to continue at the higher rate until another time threshold is reached, e.g. 8 am when the usually user leaves the house and a decrease in rate is triggered. However, to save further power, the increased rate may instead be set to remain for only a predetermined length of time, e.g. 15 minutes or half an hour, after which the client is configured to automatically decreases it again. This would avoid scanning unnecessarily often at times when the use, .e.g. during the evening night on weekdays when the user tends to remain indoors.

Another alternative is to scan at regular rate at all times (e.g. at a fixed default rate), but also trigger a "one-shot" additional scan when reaching a point in time (a time threshold) at which a new network has previously tended to become newly available. However, an embodiment using only a one-off triggered scan may fail to take into account small variations in the user's habit, e.g. if the user is 15 minutes late home from work.

The method continues cyclically over time to continue updating the log. Hence the method is shown returning to step S20 in FIG. 3. As time goes on, more entries are input into the log, increasing the amount of information about the user's habits.

For efficiency the client may be configured to consolidate multiple recurring recordals into a combined entry in the log, rather than recording a separate entry for each individual occurrence of a network. For example, the log may record that in the bin 6 pm-6:15 pm a particular network ID has been recorded N times, or that a change in network availability has been recorded N times in that time bin.

Although examples have been given above in relation to a user's routine within a day and week, the various embodiments may alternatively or additionally log network availability against times of month and/or year, and control the scanning based on these times in an analogous manner. For example, if the user has a repeat holiday destination this could lead to a recurring availability of a certain network on a yearly basis.

The above has been described in relation to scanning for wi-fi networks or other such WLANs, on the assumption that a WWAN (e.g. 3G network or other such mobile cellular network) is always present. However, in embodiments the log could alternatively or additionally be used to record availability of one or more WWANs, and control scanning for WWANs in an analogous manner to that described in relation to WLANs.

Note that in the habit-based mode of operation, the log and the client do not actually need to know where the user is located geographically—in embodiments the habits of the user can be represented purely in terms of times of day, week, month and/or year. For example, the client does not need to know that the user is in his or her house (and the log does not need to record this). Rather, the client only needs to know from the log that during the hours of 6 pm to 8 am the user tends to remain under the coverage of the same network, or that around the times of 6 pm and 8 am the network availability tends to change.

However, as mentioned, a sufficient log of habits is not always available. For example there will not be a sufficient log when the mobile terminal is brand new, has recently been reset, or when the user has moved to a new area or significantly changed his or her lifestyle. Examples of the latter case could be that the user has retired or taken on a new job (to accommodate for such cases the user may be provided with an option to wipe some or all of the log).

In these circumstances, the client running on the processor of the mobile terminal 102 is configured so as to use by way of default an alternative, position-based scanning mode. In this mode the user terminal is configured to query a look-up table providing information on coverage of WLAN and/or WWAN access networks mapped against geographic location. E.g. the table may map networks IDs against corresponding geographic locations. The look-up table may either be maintained locally on the mobile terminal 102 itself, e.g. built up based on past experience, or may be maintained on a centralized location services database to which the mobile terminal 102 has access. In the latter case, the database may be maintained by an operator, or may be built up based on the experience recoded by multiple user terminals all using a shared localization service.

The mobile 102 is thus able index the table using its own current geographic location as determined by its own positioning module (e.g. GPS 113), to determine what access networks are expected to be available in the current vicinity. For example this may be done periodically. The mobile 102 can therefore determine whether any access networks are expected to be available at all, and if so which so as to determine whether they are different from any current access network to which the mobile terminal is connected or whether they are likely to be worth scanning for. In such a mode, the mobile 102 then controls scanning for new networks in dependence on this localization table look-up. If no access networks or no new access networks are expected, the mobile 102 may reduce the rate of scanning, whereas if one or more new access networks are expected to be available based on the table, the mobile 102 may increase the rate of scanning.

The client running on the mobile terminal 102 is preferably configured to switch between the first, position-based scanning mode and the second, habit-based scanning mode in dependence on a suitable confidence measure for the log—i.e. based on whether the log has reached a suitable extent to be used to usefully control scanning. There are a number of ways to measure this. One is time, e.g. if the habits are considered cyclic over a period of 1 week, a minimum threshold for beginning to use the log may be that it has been being compiled for at least one week (or a higher threshold number of weeks to increase confidence). Another way is based on the number of entries in the log. This could be an absolute number (e.g. once the total number of past scans finding an available network has passed a certain threshold number or the total instances of networks being used has passed a threshold number). Alternatively it could be a certain density of entries per unit time, or a certain consistency of entries (e.g. the same result being found at least twice, or at least some higher threshold number, within a certain time window).

Preferably to save power from GPS signalling (or power consumed by any other positioning technology), and/or also to save power on accessing a location services database, in the habit-based mode preferably the position is not used to control scanning. Also, in the position-based mode the habit log need not be used. However, it is not excluded that one of the two modes uses a combination of the two technologies.

In order to be able to determine geographic location in the position-based scanning mode, at least some of the user terminals 102 are additionally equipped with a positioning system, coupled to the processor 112. There are various ways to obtain this localization data. Some examples of localization technologies that can be used to implement the various embodiments are now discussed.

In embodiments this takes the form of a satellite-based positioning system 113, configured to detect the geographical location of its respective user terminal 102 by reference to a plurality of satellites 107 according to techniques known in the art (usually not the same satellites as provide the back-up internet access via hub 109, though at least some of the components of the satellite transceiver 113 may be shared). An example is GPS (global positioning system), which may include an assisted GPS feature. The term GPS may be used for all similar services, that is, it includes GLONASS and Galileo. In the case of GPS, the system 113 returns a set of geographic coordinates, for example in the form of a pair of latitude and longitude values such as WGS84 (World Geodic System 1984) coordinates of the form (e.g. 51.0000, 0.5200). Using such a system readily provides geocentric coordinates, velocity, and their associated uncertainties as long as the mobile terminal has a clear view to the sky. If accelerometer data is available, it can be incorporated as an acceleration observation, e.g. which fits into a Kalman filtering framework.

In other embodiments, the positioning system could alternatively or additionally comprise a cellular positioning system in the form of cellular positioning code stored on the memory 110 and arranged for execution on the processor 112. In that case, the cellular positioning code is arranged to detect the location of the user terminal 102 by reference to one or more base stations 104. This can be achieved crudely by identifying the location of the base station 104 which is currently serving the user terminal 102, or more accurately by identifying the location of a plurality of nearby base stations 104 and performing a trilateration. In the latter case, the trilateration works by detecting the time for a signal to travel between the user terminal 102 and each of the respective base stations 104. The signal can also travel the other way, from base station to mobile terminal. In another example position can be determined based on signal strength relative to one or more known cells or base stations 104, or a trilateration can be refined by also taking into account signal strength. The detection could be performed by the cellular positioning system 113 running on the user terminal 102 itself, or could be performed by another network element such as controller station 105 and then signalled to the positioning system 113 running on the user terminal 102.

Another option is that the positioning system comprises code configured to detect the position of the respective user terminal 102 by reference to the location of one or more nearby WLAN access points 106. This may be achieved by detecting an identifier (ID) of one or more access points 106. Either the ID of the access point 106 could be mapped to a known location of the access point, or the ID itself could be used directly as an indication of geographic location. WLAN networks have small coverage and therefore simply observing a nearby wi-fi access point is a good location indicator. If the position of the wi-fi access point is known, this location can be directly mapped to coordinate data. Over time, a database of wi-fi access point locations can be built when they are observed and the mobile terminal's location is known (for example, if GPS is running). In some implementations however, there may be little need to map wi-fi IDs to geographical positions. Instead, an alternative is to use the wi-fi ID for table lookup directly.

In the case of detecting the location by reference to one or more base stations 104 or to a wireless access point 106, the positioning calculation (e.g. the trilateration) may be taken care of on a host terminal of the respective network 103 or 101 (e.g. on a cellular controller station 105 or a server in communication with the wireless access point 106). The positioning system on the user terminal 102 would then comprise a suitable programming interface for retrieving the location information from the host terminal. However, another possibility is for the user terminal 102 performing its own positioning calculation by reference to the one or more base stations 104 or wireless access point 106 is not excluded, e.g. by performing its own cell trilateration.

Other methods also exist. For example, the location of a mobile phone can be calculated by comparing a multipath signal pattern received by a base station with prior known information stored in a database through pattern matching algorithms known as fingerprinting.

Whatever form the positioning system 113 takes, in various embodiments it is configured to detect the geographical location of its own respective user terminal 102. That is to say, by means of a measurement or determination process that is at least partially automated, rather than location information simply being entered manually at the respective user terminal 102 for example. However, the option of a manually entered location is not excluded.

Aggregated localization techniques may also be used, i.e. combining different localization techniques. For example the Skyhook and Place Lab systems make use of GPS, cell and wi-fi ID.

In further optional embodiments, the log may also take into account connection quality. In this case, along with the time of availability, step S20 may log a measure of connection quality that the mobile terminal 102 experienced when it connected to the WLAN in question (and optionally geographical location). Step S30 then asks whether a good quality connection has consistently been found at the present time of day/week (and optionally at the present location). For example, there a minimum threshold quality may be set, below which the client determines it is not worth increasing the scan frequency.

The term quality may be used herein to refer to either fidelity and/or reliability. Fidelity is a measure of a property such as the bandwidth or signal strength available on a particular connection. Reliability is a measure of a property such as how often a connection fails, or the amount of time the connection is available (a connection could be high fidelity when it is available, but not be available very often, or vice versa). Quality may also refer to properties such as latency, loss and/or jitter. In a particular embodiment, quality is an aggregation of latency, bandwidth, reliability, loss and jitter. Alternatively the quality may comprise any or all of these properties.

The processing apparatus 112 may be provided with a suitable algorithm for making measurements such as peak, average or typical uplink or downlink bandwidth, connection strength, connection up-time or down-time, latency, loss, jitter, or an aggregate measure or any or all of these.

It will be appreciated that the above embodiments have been described only by way of example. Other variants may become apparent to a person skilled in the art given the disclosure herein. The scope of the claimed subject matter is not limited by the described examples but only by the accompanying claims.

The invention claimed is:

1. A mobile terminal for use in a communication system comprising a first, packet-based network and a plurality of wireless access networks providing access to the first network; the mobile terminal comprising:
   one or more transceivers for connecting to the wireless access networks;
   a positioning module arranged to determine a current geographical location of the mobile terminal; and
   processing apparatus coupled to the positioning module and the one or more transceivers, operable to communicate with the first network by forming connections with the wireless access networks using the one or more transceivers;
   wherein the processing apparatus is configured to maintain a log of past availability to said mobile terminal or past use by said mobile terminal of one or more of said wireless access networks;
   wherein the processing apparatus is configured to control activation of at least one of the one or more transceivers to scan for availability of one or more of the wireless access networks; and
   wherein the processing apparatus is configured to switch between a first mode of operation in which said scanning is controlled in dependence on the current geographical location of the mobile terminal as determined by the positioning module, and a second mode of operation in which said scanning is controlled in dependence on said log.

2. The mobile terminal of claim 1, wherein the processing apparatus is configured to switch from said first mode of operation to said second mode of operation on condition that the log has reached a threshold for a confidence measure.

3. The mobile terminal of claim 1, wherein the processing apparatus is configured to switch between said first and second modes of operation in dependence on a current geographical area detected using the positioning module.

4. The mobile terminal of claim 1, wherein the second mode of operation being selected, said scanning, in the second mode of operation, is controlled in dependence on said log instead of the current geographical location.

5. The mobile terminal of claim 4, wherein in the second mode of operation the processor is configured to switch off the positioning module or place the positioning module into a reduced power state.

6. The mobile terminal of claim 1, wherein the processing apparatus is configured to maintain the log of past availability or use relative to time of day, week, month and/or year, to identify one or more times of day, week, month and/or year in which a difference in said availability or use is estimated to have occurred on a habitual basis, and to compare the one or more identified times with a current time of day, week, month and/or year; and in the second mode the scanning is controlled in dependence of said comparison of the one or more identified times with the current time.

7. The mobile terminal of claim 1, wherein the processing apparatus is configured to perform instances of said scan at regular rate, and to control said activation by varying the rate in dependence on said comparison.

8. The mobile terminal of claim 6, wherein the processing apparatus is configured to perform instances of said scan at regular rate, and to control said activation by varying the rate in dependence on said comparison, said activation being controlled by one or both of:

increasing the rate of the scan on condition that the availability or use is estimated to have habitually increased around one of said identified times; and decreasing the rate of the scan per unit time on condition that the availability or use is estimated to have habitually decreased around one of said identified times.

9. The mobile terminal of claim 6, wherein the processing apparatus is configured to control said activation by triggering an instance of the scan at one of said identified times.

10. The mobile terminal of claim 6, wherein said one or more identified times comprise one or more identified time windows, or one or more identified points in time.

11. The mobile terminal of claim 1, wherein the processing apparatus is configured to automatically select which of a plurality of available ones of said wireless access networks to use to connect to the first network, in dependence the scan.

12. The mobile terminal of claim 1, wherein:

the wireless access networks comprise a plurality of wireless local area networks and one or more wireless wide area networks, the one or more transceivers comprising a local transceiver for connecting to the wireless local area networks and a further transceiver for connecting to the wireless wide area networks; and said control by the processing apparatus comprises controlling activation of at least the local transceiver to scan for subsequent availability of one or more of the wireless local area networks.

13. The mobile terminal of claim 12, wherein:

the wireless local area networks comprises at least one of a Wi-Fi network, a HiperLAN network, a HomeRF network, an OpenAir network and a Bluetooth network; and the one or more wireless wide area networks comprise one or more of an LTE, W-CDMA, GSM, UMTS, UTRAN, HSPA, CDMA2000 or other 3GPP network, a WiMAX network, a CDPD network and a Mobitex network.

14. The mobile terminal of claim 12, wherein the processing apparatus is configured to automatically select whether to connect to the first network via one of the wireless wide area networks or one of the wireless local area networks, in dependence on the scan.

15. The mobile terminal of claim 1, wherein the first network is the Internet.

16. The mobile terminal of claim 1, wherein the processing apparatus is configured to use one or more of said connections to conduct a communication in the form of a live packed-based voice or video call over the first network.

17. The mobile terminal of claim 11, wherein the processing apparatus is configured so as, during an ongoing communication with the first network using a current one of said connections, to perform the selection and switch the communication from the current connection to another one of said connections using the selected one of the wireless local area networks or a wireless wide area network.

18. A computer program product for use in a communication system comprising a first, packet-based network and a plurality of wireless access networks providing access to the first network, the computer program product being embodied on a computer-readable hardware storage medium and comprising code configured so as when executed on a processing apparatus of a mobile terminal to perform operations comprising:

communicating with the first network by forming connections with the wireless access networks using one or more transceivers of the mobile terminal;

maintaining a log of past availability to the mobile terminal or past use by the mobile terminal of one or more of said access networks;

controlling activation of at least one of the one or more transceivers to scan for availability of one or more of the wireless access networks; and switching between a first mode of operation in which said scanning is controlled in dependence on a current geographical location of the mobile terminal, and a second mode of operation in which said scanning is controlled in dependence on said log.

19. A mobile terminal for use in a communication system comprising a first, packet-based network, multiple wireless local area networks providing access to the first network, and one or more wireless wide area networks providing access to the first network; the mobile terminal comprising:

a local transceiver for connecting to the wireless local area networks;

a longer-range cellular transceiver for connecting to the one or more wireless wide area networks;

a positioning module arranged to determine a current geographical location of the mobile terminal; and processing apparatus coupled to said transceivers and said positioning module, operable to conduct live, packet-based voice or video calls over the first network by forming connections with the wireless local area networks using the local transceiver and connections with the one or more wireless wide area networks using the cellular transceiver;

wherein the processing apparatus is configured to observe availability to said mobile terminal of at least a plurality of said wireless access networks, based on the observation to maintain a log of past observed availability to the mobile terminal of the plurality of wireless local area networks or past use when observed to be available, the log being maintained relative to time of day, week, month and/or year, wherein the processing apparatus is configured to identify times of day, week, month and/or year in which a difference in said availability or use is estimated to have occurred on a habitual basis, and to compare the identified times with a current time of day, week, month and/or year;

wherein the processing apparatus is configured to control activation of at least the local transceiver to scan for availability of ones of the wireless local area networks, by performing instances of said scan at regular rate and varying the rate in dependence on said comparison of the identified times with the current time;

wherein the processing apparatus is configured to instigate a hand over between two of said wireless local area networks or between one of the wireless wide area networks and one of the wireless local area networks, during an ongoing one of said live voice or video calls, in dependence on said scan;

wherein the processing apparatus is configured to automatically switch between a first mode of operation in which said scanning is controlled in dependence on the current geographical location of the mobile terminal as determined by the positioning module, and a second mode of operation in which said scanning is instead controlled in dependence on said log; and wherein in the second mode of operation, the positioning module is switched off or in a reduced power state.

* * * * *